Sept. 7, 1965  A. M. HAND  3,204,796
SYSTEMS FOR TRANSFERRING DEMOUNTABLE FREIGHT CONTAINERS BETWEEN
MOVABLE VEHICLES AND EXTERNAL SUPPORTS
Filed May 6, 1964  2 Sheets-Sheet 1
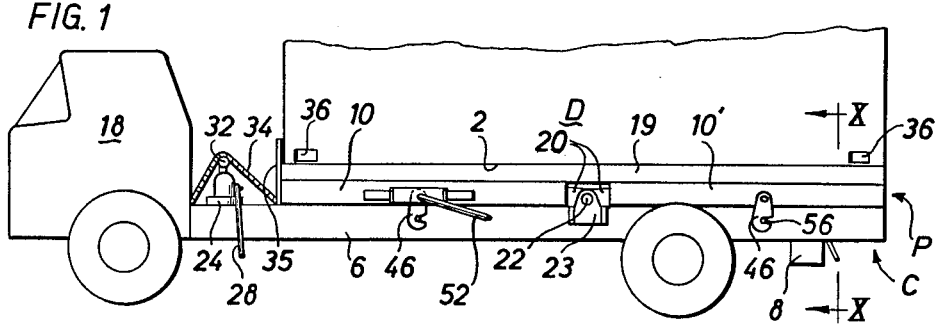
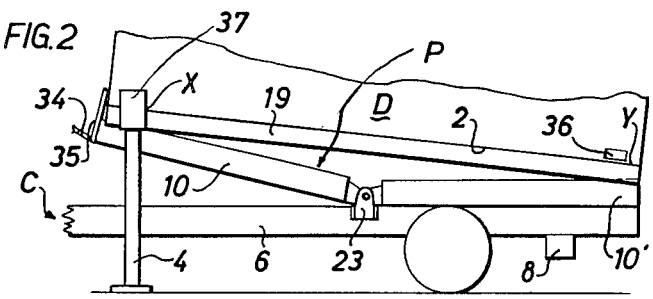
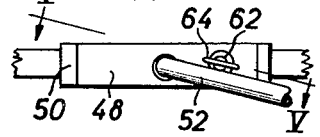
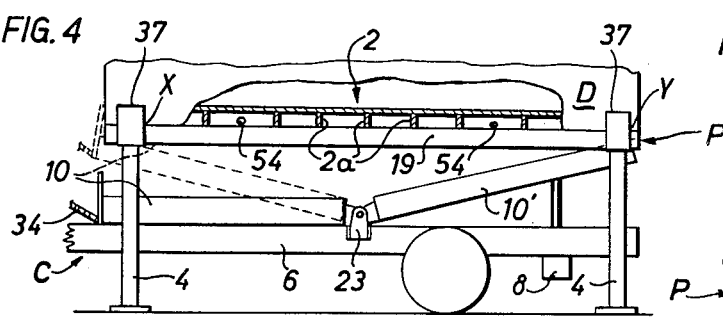
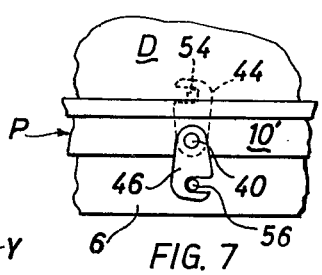
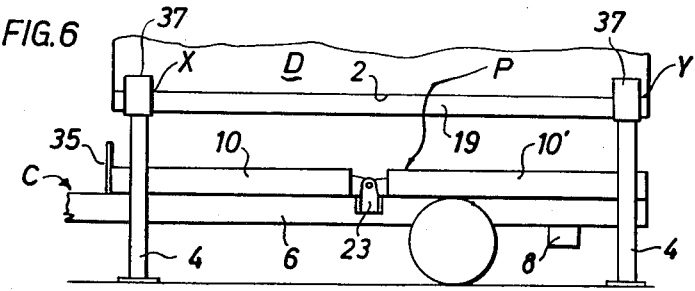
INVENTOR
Albert M. Hand
By Prangley, Baird, Clayton, Miller & Vogel,
Attys.

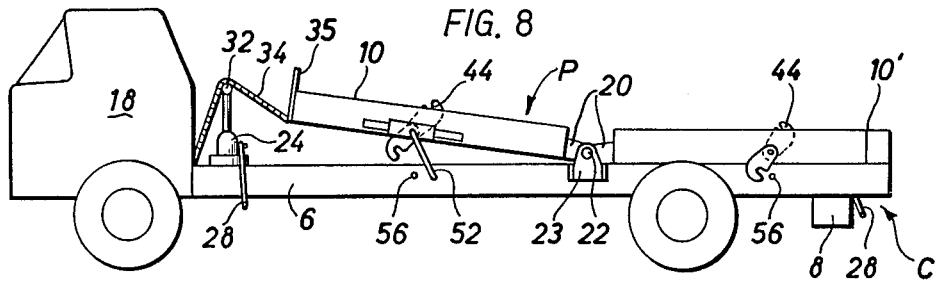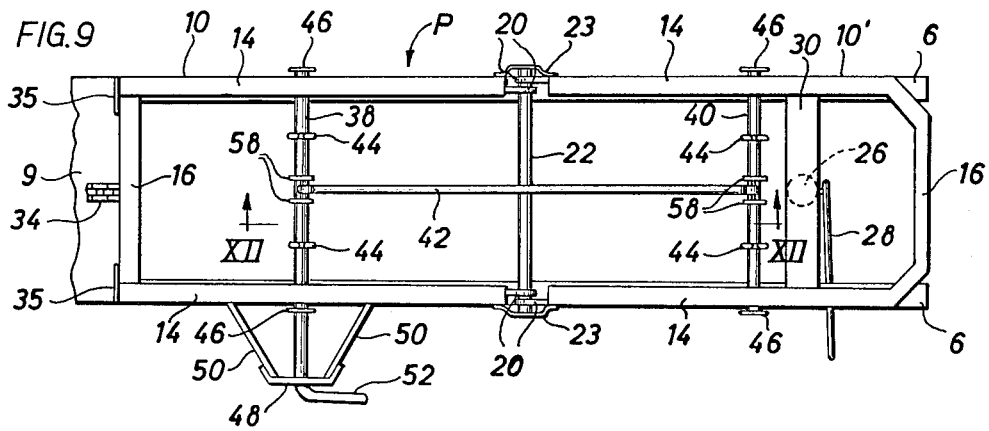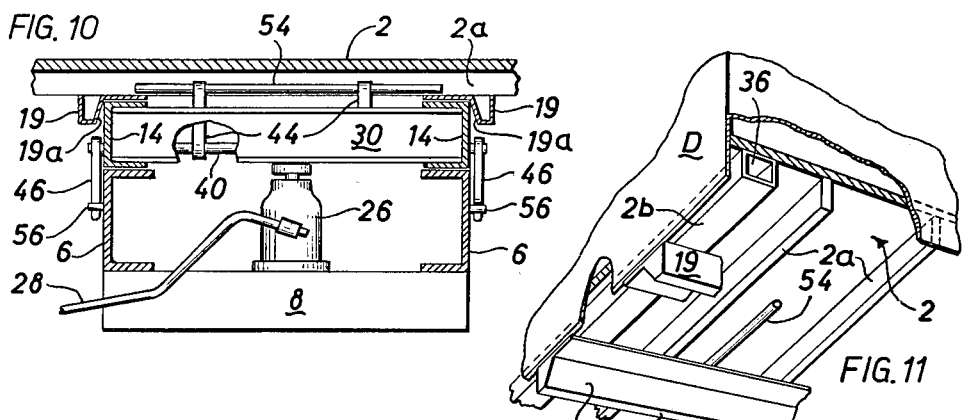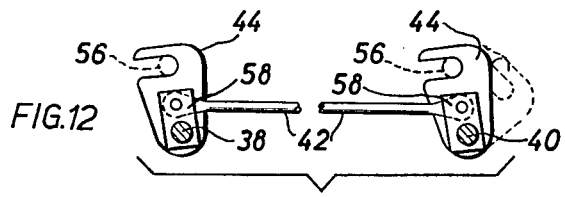
INVENTOR
Albert M. Hand

United States Patent Office 3,204,796
Patented Sept. 7, 1965

3,204,796
SYSTEMS FOR TRANSFERRING DEMOUNTABLE FREIGHT CONTAINERS BETWEEN MOVABLE VEHICLES AND EXTERNAL SUPPORTS
Albert M. Hand, Etobicoke, Ontario, Canada, assignor to General American Transportation Corporation
Filed May 6, 1964, Ser. No. 365,369
9 Claims. (Cl. 214—515)

The present invention relates to means for transferring demountable freight containers onto or off a mobile vehicle.

The mobile vehicle specifically contemplated herein may for example, be constituted by a truck and the freight container by a truck body demountably mountable on the chassis of said truck and transportable thereby.

The utility of trucks with demountably mountable (or transferable) containers is now well recognized. That is to say by demounting and leaving a container at a loading (or unloading) site, the truck and its driver are thus liberated to engage or be employed in other renumerative activities until such time as the said container is loaded (or unloaded) and hence ready to be retrieved and transported to another site.

It will, therefore, be obvious that the ease or difficulty of transferring such containers may well be an important factor in the feasibility and general economics of moving goods by equipment as herein visualized and it is upon these considerations that the invention accordingly has the broad objective of providing a new and improved means for transferring containers from or on to a mobile vehicle.

More specifically, the invention seeks to provide improvements in the mobile vehicle facilitating and expediting such transfer.

It is a still further object of the invention to provide structure able to support the container safely and firmly both while it is being transported and also during the transfer thereof at the loading site.

It is a further object of the invention to provide structure as aforesaid permitting a more or less uniform loading of the vehicle chassis when the container is mounted thereon.

It is a further object of the invention to provide said structure with facilities for releasably locking the container thereto when required, as, for example, in transit.

A yet further object of the invention is to provide a vehicle chassis equipped with container supporting and transferring means arranged and organized to obviate the necessity for heavy duty construction thereof and further to permit actuation thereof by relatively lightweight mechanisms which may even be manually operated.

It is a further object of the invention to provide a vehicle chassis equipped with means for elevating each end of a container independently of the other and without raising or lowering said other container end in the course of transferring said container to an external support.

It is a further object of the invention to provide a mobile vehicle including a container support whose ends are separately movable in a generally vertical direction to raise and/or lower the container in the course of transferring the container between said vehicle and an external support.

It is, of course, a most important object of the invention to provide equipment of the character described with improved manoeuvrability versatility, efficiency and reliability in use.

A still further object of the invention is to provide a mode of container transfer which is simple and efficient in operation and which does not depend for its efficiency upon the use of heavy duty equipment.

The invention achieves its objects by providing a mobile vehicle including an elongated chassis extending longitudinally thereof and an elongated platform disposed on top of said chassis providing support for a demountable container having an elongated base seated on said platform. The platform has ends respectively underlying the ends of said container when it is seated on said platform; each said platform end being elevatable independently of the other to apply upward thrust to the container end overlying it to raise said container base to an elevated plane well above the plane of its seated position permitting propping of the container by external devices for supporting it with the base in said elevated plane; said platform ends being then lowerable to leave said container supported entirely by said external devices and permitting withdrawal of said vehicle from beneath said container.

Other objects of the invention will become apparent from the ensuing description of the elements, parts and principles constituting the invention whereof a selected embodiment is illustrated by way of example only in the hereunto annexed drawing wherein:

FIG. 1 is a side elevational view of a truck constructed in accordance with the invention having a demountable container mounted thereon, the container being partly broken away;

FIGS. 2, 4 and 6 are fragmentary schematic views illustrating steps in the transferring of the container from the truck to an external support; the container being partially broken away in FIG. 4 to reveal otherwise hidden structural detail;

FIGS. 3, 5, and 7 illustrate constructional details of mechanism for locking the container in mounted position on the truck, FIG. 5 being a section on the line V—V of FIG. 3;

FIG. 8 is a side elevation of the truck shown in FIG. 1 with the container demounted and illustrating the action of transfer means for the container;

FIG. 9 is a top plan view of the transfer means shown in FIG. 8 but with the means in its normal position illustrated in FIG. 1;

FIG. 10 is a section on the line X—X of FIG. 1;

FIG. 11 is a fragmentary perspective view of the underside or base of the container shown in FIG. 1; and FIG. 12 is a section on the line XII—XII of FIG. 9.

A mobile vehicle in accordance with the invention is shown in FIG. 1 as comprising a truck having a demountable container D mounted thereon.

The truck may have driving gear of conventional type but since such gear does not form part of the present invention details thereof have been omitted from the drawings for the sake of clarity.

The truck includes an elongated chassis C and an elongated platform P disposed on top of said chassis, both the chassis and the platform extending longitudinally of the truck.

The container D has an underside or base 2 seatable on the platform P, and is elevatable well above the plane of its seated position to a level or plane at which it may be propped by external devices such as legs 4 while the truck is driven away from beneath it. The means for effecting such elevation will be described in more detail hereinafter but it will be clear from a brief study of FIGS. 2, 4, and 6 that first one end of the container may be raised for propping by a pair of legs 4 and then the other end may similarly be raised and propped.

The truck chassis C is generally conventional in form and includes a pair of girders 6—6 extending longitudinally of the vehicle, the girders being linked by crossbars such as 8 and 9.

The chassis C forms a mounting for the platform P which, as shown best in FIGS. 8 and 9, is divided transversely to provide a pair of separate front and rear ends or sections designated respectively at 10 and 10'. For the sake of simplicity said division has been effected in the presently preferred example substantially midway along the platform P to provide the end sections 10—10' of approximately equal length. Each platform end 10 or 10' is generally U-shaped and comprises a pair of substantially parallel beams 14—14 interconnected by a bight 16. As will be seen from FIG. 9, the platform P overlies and is substantially conterminous with the chassis C, or at any rate with those portions thereof which extend rearwards of the truck driver's cab 18, whereby the beams 14—14 of each platform end are normally in contact with and supported along substantially their full lengths by the chassis girders 6—6. By reason of this support the platform P may be of relatively light construction since when so supported, it is reinforced by the chassis C.

The elongated base 2 of the container D includes transverse ribs 2a and 2b having a pair of spaced, parallel, longitudinally extending rails 19—19 secured thereto, FIGS. 10 and 11. It will be noted that the rails depend somewhat below the level of the base 2 and include outwardly divergent faces 19a—19a. The rails 19—19 provide lateral location facilities for the container D on the platform P and the faces 19a—19a afford a funnelling effect for the platform as the container is positioned thereon, the upper edges of said divergent faces being spaced apart a distance substantially equal to the width of the platform.

The platform P may be substantially equal in length to the base 2 of the container D as shown, and in such case it should be noted that in normal transit position the burden of the container is distributed substantially uniformly along the full length of the platform, which transmits said burden directly to the underlying portions of the chassis. Undue stressing of the chassis such as might be caused by applying the burden thereto at a few discrete points is thereby avoided.

By means of bearings 20—20 carried by the beams 14—14 each platform end 10 or 10' is tiltably mounted for elevation and lowering relative to the chassis C. Specifically this is effected in the present embodiment by a shaft 22 journalled in said bearings 20—20 and carried by brackets 23 fixed to the chassis girders 6—6. When the platform is assembled in this fashion the platform ends can then be swung upwards away from the chassis C as shown at the left-hand side of FIG. 8, the bearings 20 turning on the shaft 22 to permit this.

Means is provided for elevating or tilting said platform ends independently of each other in the manner outlined above; the preferred means in the present embodiment being hydraulic jacks 24 and 26 used respectively to elevate the front and rear platform ends 10 and 10'. Said jacks may be operable manually by means of handles 28, or may be power operated. Examples of other suitable tilting means are screw-type jacks or powered hydraulic cylinders.

As shown particulary in FIG. 10 the jack 26 is mounted on the chassis cross-bar 8 and applies thrust directly against a transverse brace 30 carried by the rear platform end 10'; to allow the jack 26 to be interposed between the said brace 30 and the cross-bar 8 the latter is connected to the girders 6—6 with its upper face occupying approximately the same horizontal plane as the lower faces of the girders.

It is desirable, however, that the jack 24 be mounted at a level where it does not interfere with the transmission elements of the truck and accordingly said jack 24 is mounted on the chassis cross-bar 9 which is substantially level with the upper edges of the girders 6. The lifting arm of the jack 24 carries a roller 32 over which passes a heavy metal chain 34 connected at one end to the bight 16 of the front platform end 10 and at the other to the chassis cross-bar 9. When the lifting arm of the jack 24 is raised the roller 32 applies thrust to the chain 34 and acts through said chain 34 to elevate the front platform end 10 as shown in FIG. 8. Abutments 35 carried by the front end 10 adjacent its bight 16 locate the container D longitudinally on the platform P and prevent it from fouling the chain 34.

It should be observed that in FIGS. 1 and 8 the spacing between the cab 18 and abutments 35 has been somewhat exaggerated in order clearly to illustrate the jack 24.

The way in which the container D is elevated for propping on legs 4 will now be apparent. The normal transit position of the platform P and container D is shown in FIG. 1. One of the jacks 24 and 26 is then operated to elevate one of the platform ends 10—10'. As illustrated in FIG. 2 the jack 24 is operated first to elevate the front platform end 10. As the platform end 10 is elevated it applies upward thrust to the container front end overlying it and raises it whereby the container D assumes a position slightly inclined to the horizontal. The amount of elevation may be in the order of twelve inches more or less although the elevation has been somewhat exaggerated in the drawings for the sake of clear presentation. Having thus raised the container front end the operator applies propping means thereto, in this case one pair of the legs 4 which may be of the type illustrated in FIG. 6 of the drawings annexed to my patent application, Serial No. 265,496, filed March 15, 1963, to which application reference may be made for a detailed description of such legs 4. Said legs 4 are detachable from the container D and have elements 37 engageable in housings 36 provided in the ribs 2b at the four corners of the container D. Obviously the elements 37 of the pair of legs 4 mentioned above are engaged in the housings 36 provided in the front end of the container D which has been raised as described. Thereafter the front platform end 10 may be lowered to its normal position in which it rests on the chassis C, leaving the overlying container front end supported by the legs 4 at the level to which it has been raised.

Subsequently the jack 26 is operated to elevate the rear platform end 10', as illustrated in FIG. 4, which in turn applies thrust to the container rear end overlying it and raises it to the same level as the container front end. The operator then fits a further pair of legs 4 in the housings 36 provided in the newly raised rear end of the container D and lowers the rear platform end 10' to its normal transit position, FIG. 6, leaving the container D wholly supported by the two pairs of legs 4 at a level wherein the container base 2 lies in a plane well above the plane of its seated position on the platform P.

At this stage the truck can be driven away from beneath the container D which can be loaded or unloaded while the truck is usefully employed elsewhere, as transport for a newly loaded container, for example.

It will be understood that the exact sequence of the above operations may be varied in several ways. For instance the jacks 24 and 26 may be operated simultaneously, although in the case of the present embodiment this would require two operators. If this is done the container D rises to its elevated position on a substantially even keel instead of being slightly inclined as when it is raised by the platform ends acting independently. Operation of the mechanism in this manner is suggested by the broken line representation of the front platform end 10 in FIG. 4.

What ever sequence is followed, however, the container D is supported at all times during the transfer operation at two widely spaced points, at least, along the length of the container, whereby longitudinal stability of the container D during said operation is ensured. Said points are designated X and Y in FIGS. 2 and 4. Lateral stability during transfer is ensured by the engagement of the rails 19 with opposite sides of the platform P at the points X and Y while the container D is supported by the platform P, and thereafter by the legs 4 disposed at opposite sides of the container D.

To load the container D on to the platform P again the operations detailed above are carried out in reverse order. That is to say the truck is backed into position with its platform P underlying the base 2 of the container D while the latter is supported by the legs 4. The platform ends 10–10' are then elevated into supporting relationship with the base 2, allowing the legs 4 to be removed from the housings 36 whereupon the respective platform ends 10–10' are lowered to their normal positions and the base 2 assumes a seated relationship with the platform P wherein the rails 19—19 overhang the platform beams 14 as illustrated in FIGS. 1 and 10.

Locking mechanism may be provided to retain the container D and platform P in their normal transit positions relative to the chassis C and may take the form shown in FIGS. 8 and 9 wherein shafts 38 and 40 are rotatably mounted respectively in platform ends 10–10' and are connected for operation in unison by linkage 42. Each shaft 38 or 40 carries rigidly mounted thereon a pair of upwardly extending hooks 44 and a pair of downwardly extending hooks 46, the mouths of said pairs of hooks 44 and 46 facing in opposite directions. The shaft 38 projects laterally of the platform P where it may be journalled in a plate 48 supported by structure 50 mounted on the front platform end 10, a handle 52 being carried by the shaft 38 to effect rotation thereof.

In operative position the hooks 44 co-operate with bars 54, secured to the rails 19—19 and extending transversely of the container base 2 and the hooks 46 co-operate with lateral projections 56 carried by the chassis girders 6—6 said operative position being illustrated best in FIG. 7 which is a fragmentary side view of the locking mechanism carried by the rear platform end 10'. With hooks 44–46 so disposed the container D is restrained against movement relative to the platform P and the platform ends 10–10' are restrained against movement relative to the chassis C; all said parts thus being more or less rigidly held in their normal positions. This is the normal situation of the locking means during transit of the truck whether the container D is mounted thereon or not.

Obviously before the container D can be transferred between the platform P and the legs 4 or other external support the locking mechanism must be moved to its inoperative position. This is effected by rotating the shaft 38 in a clockwise direction, FIG. 8, by means of the handle 52. By this action the hooks 44 and 46 on the shaft 38 are respectively swung out of engagement with the bars 54 and projections 56 and similar movement is transmitted by the linkage 42 to the shaft 40 and the hooks 44–46 carried thereby. With the hooks 44–46 disengaged as aforesaid the platform ends 10–10' are free for elevation relative to the chassis C by means of the jacks 24 and 26 and the container D is free to move relative to the platform P.

The linkage 42 may comprise a rod extending longitudinally of the chassis and pivotally connected to arms 58 rigidly mounted on the shafts 38 and 40. As explained above, the platform ends 10–10' can be raised from their normal positions only when the locking mechanism is in its inoperative position. As one or other of the platform ends 10–10' is elevated such movement may cause slight rotation of one or both of the shafts 38 and 40 owing to their interconnection by the linkage 42; which slight rotation is of no consequence.

The handle 52 may carry latching means in the form of a spring-biased plunger 60, FIGS. 3 and 5, slidable in a housing 62 attached to the handle, said plunger having a hand grip 64. When the locking mechanism is in its operative or locking position the plunger 60 enters a hole 66 in the plate 48 to latch the mechanism in said position. The plunger 60 must be withdrawn from the hole 66 before the locking mechanism can be moved to its inoperative or unlocking position.

To sum up the specific embodiment of the invention described herein contemplates a truck having mounting facilities for a demountable freight container D, and also having facilities for transferring said container D between the truck and a support external to the truck. Said mounting and transferring facilities include the platform P with its independently tiltable front and rear ends or sections pivotally connected to and supportable by the truck chassis C. The jacks 24 and 26 serve to tilt the platform ends which in turn apply upward thrust to the container ends overlying them whereby the container D may be raised to a level where it can be propped by the legs 4. After said propping the platform ends are lowerable to their normal position permitting the truck to be driven away from beneath the container D.

While the embodiment described herein and illustrated in the drawings constitutes the presently preferred form of the invention, it will be understood that said embodiment has been described and illustrated merely by way of example and not with any limiting intention since many modifications may be made thereto within the scope of the claims now following.

What is claimed is:

1. In combination, a mobile vehicle including
   an elongated longitudinally extending chassis,
   an elongated longitudinally extending composite platform supported on top of said chassis and including front and rear sections respectively disposed in corresponding adjacent longitudinal positions,
   means mounting said front platform section adjacent to the rear thereof upon said chassis disposed therebelow for pivotal movements about an axis extending substantially laterally of said chassis and between normal and operative positions,
   said front platform section in its normal position being generally horizontally disposed and in its operative position being upwardly and forwardly inclined,
   means mounting said rear platform section adjacent to the front thereof upon said chassis disposed therebelow for pivotal movements about an axis extending substantially laterally of said chassis and between normal and operative positions,
   said rear platform section in its normal position being generally horizontally disposed and in its operative position being upwardly and rearwardly inclined,
   actuating means for selectively moving said platform sections independently of each other and between their respective normal and operative positions,
   and a demountable freight container including an elongated longitudinally extending base adapted to be supported on top of said composite platform,
   wherein said container is so supported in a generally horizontal low position when said front and rear platform sections occupy their respective normal positions,
   wherein said container is so supported in a generally horizontal high position when said front and rear platform sections occupy their respective operative positions,
   wherein said container is so supported in a forwardly inclined position when said front and rear platform sections occupy their respective operative and normal positions,
   and wherein said container is so supported in a rearwardly inclined position when said front and rear platform sections occupy their respective normal and operative positions.

2. In combination, a mobile vehicle including
   an elongated longitudinally extending chassis,
   an elongated longitudinally extending composite platform supported on top of said chassis and including front and rear sections respectively disposed in corresponding adjacent longitudinal positions,
   means mounting said front platform section adjacent to the rear thereof upon said chassis disposed therebelow for pivotal movements about an axis extending substantially laterally of said chassis and between normal and operative positions, said front platform section in its normal position being generally horizontally disposed and in its operative position being upwardly and forwardly inclined, means mounting said rear platform section adjacent to the front thereof upon said chassis disposed therebelow for pivotal movements about an axis extending substantially laterally of said chassis and between normal and operative positions, said rear platform section in its normal position being generally horizontally disposed and in its operative position being upwardly and rearwardly inclined, first motor means acting between the front portion of said front platform section and the adjacent portion of said chassis disposed therebelow for selectively moving said front platform section between its normal and operative positions, second motor means acting between the rear portion of said rear platform section and the adjacent portion of said chassis disposed therebelow for selectively moving said rear platform section between its normal and operative positions, and a demountable freight container including an elongated longitudinally extending base adapted to be supported on top of said composite platform, wherein said container is so supported in a generally horizontal low position when said front and rear platform sections occupy their respective normal positions, wherein said container is so supported in a generally horizontal high position when said front and rear platform sections occupy their respective operative positions, wherein said container is so supported in a forwardly inclined position when said front and rear platform sections occupy their respcetive operative and normal positions, and wherein said container is so supported in a rearwardly inclined position when said front and rear platform sections occupy their respeicitve normal and operative positions.

3. In combination, a mobile vehicle including
an elongated longitudinally extending chassis, an elongated longitudinally extending composite platform supported on top of said chassis and including front and rear sections respectively disposed in correspondingly adjacent longitudinal positions, a shaft carried by said chassis and extending substantially laterally thereacross and positioned longitudinally adjacent to the rear of said front platform section and adjacent to the front of said rear platform section, first means mounting the rear of said front platform section upon said shaft for pivotal movements thereabout and substantially laterally of said chassis and between normal and operative positions, said front platform section in its normal position being generally horizontally disposed and in its operative position being upwardly and forwardly inclined, second means mounting the front of said rear platform section upon said shaft for pivotal movements thereabout and substantially laterally of said chassis and between normal and operative positions, said rear platform section in its normal position being generally horizontally disposed and in its operative position being upwardly and rearwardly inclined, actuating means for selectively moving said platform sections independently of each other and between their respective normal and operative positions, and a demountable freight container including an elongated longitudinally extending base adapted to be supported on top of said composite platform, wherein said container is so supported in a generally horizontal low position when said front and rear platform sections occupy their respective normal positions, wherein said container is so supported in a generally horizontal high position when said front and rear platform sections occupy their respective operative positions, wherein said container is so supported in a forwardly inclined position when said front and rear platform sections occupy their respective operative and normal positions, and wherein said container is so supported in a rearwardly inclined position when said front and rear platform sections occupy their respective normal and operative positions.

4. In combination, a mobile vehicle including
an elongated longitudinally extending chassis, an elongated longitudinally extending composite platform supported on top of said chassis and including front and rear sections respectively disposed in corresponding adjacent longitudinal positions, means mounting said front platform section adjacent to the rear thereof upon said chassis disposed therebelow for pivotal movements about an axis extending substantially laterally of said chassis and between normal and operative positions, said front platform section in its normal position being generally horizontally disposed and in its operative position being upwardly and forwardly inclined, means mounting said rear platform section adjacent to the front thereof upon said chassis disposed therebelow for pivotal movements about an axis extending substantially laterally of said chassis and between normal and operative positions, said rear platform section in its normal position being generally horizontally disposed and in its operative position being upwardly and rearwardly inclined, actuating means for selectively moving said platform sections independently of each other and between their respective normal and operative positions, said chassis including a pair of longitudinally extending and laterally spaced-apart side sills, said front platform section including a pair of longitudinally extending and laterally spaced-apart side members respectively overlying and supported upon the adjacent portions of said side sills when said front platform section occupies its normal position, said rear platform section including a pair of longitudinally extending and laterally spaced-apart side members respectively overlying and supported upon the adjacent portions of said side sills when said rear platform section occupies its normal postion, and a demountable freight container including an elongated longitudinally extending base adapted to be supported on top of said composite platform, wherein said container is so supported in a generally horizontal low position when said front and rear platform sections occupy their respective normal positions, wherein said container is so supported in a generally horizontal high position when said front and rear platform sections occupy their respective operative positions, wherein said container is so supported in a forwardly inclined position when said front and rear platform sections occupy their respective operative and normal positions, and wherein said container is so supported in a rearwardly inclined position when said front and rear platform sections occupy their respective normal and operative positions.

5. The combination set forth in claim 4, wherein
said base includes a pair of longitudinally extending and laterally spaced-apart side elements respectively overlying and supported upon said front platform section side members and said rear platform section side members when said front and rear platform sections respectively occupy their normal positions, 6. The combination set forth in claim 4,
and further comprising a pair of longitudinally extending and laterally spaced-apart guide rails carried by the bottom of said base and adapted to straddle said front and rear platform section side members when said front and rear platform sections occupy their respective normal positions so as to center said container when it is supported in its low normal position by said composite platform.

7. In combination, a mobile vehicle including
an elongated longitudinally extending chassis,
an elongated longitudinally extending composite platform supported on top of said chassis and including front and rear sections respectively disposed in corresponding adjacent longitudinal positions,
means mounting said front platform section adjacent to the rear thereof upon said chassis disposed therebelow for pivotal movements about an axis extending substantially laterally of said chassis and between normal and operative postions,
said front platform section in its normal position being generally horizontally disposed and in its operative position being upwardly and forwardly inclined,
means mounting said rear platform section adjacent to the front thereof upon said chassis disposed therebelow for pivotal movements about an axis extending substantially laterally of said chassis and between normal and operative positions,
said rear platform section in its normal position being generally horizontally disposed and in its operative position being upwardly and rearwardly inclined,
actuating means for selectively moving said platform sections independently of each other and between their respective normal and operative positions,
a demountable freight container including an elongated longitudinally extending base adapted to be supported on top of said composite platform,
wherein said container is so supported in a generally horizontal low position when said front and rear platform sections occupy their respective normal positions,
wherein said container is so supported in a generally horizontal high position when said front and rear platform sections occupy their respective operative positions,
wherein said container is so supported in a forwardly inclined position when said front and rear platform sections occupy their respective operative and normal positions,
and wherein said container is so supported in a rearwardly inclined position when said front and rear platform sections occupy their respective normal and operative positions,
and locking mechanism having lock and unlock positions,
said mechanism in its lock position locking said front and rear platform sections in their respective normal positions to said chassis and also locking said base to said front and rear platform sections in their respective normal positions.

8. In combination, a mobile vehicle including
an elongated longitudinally extending substantially rectangular chassis,
an elongated longitudinally extending substantially rectangular composite platform supported on top of said chassis and including front and rear sections respectively disposed in corresponding adjacent longitudinal positions,
means mounting said front platform section adjacent to the rear thereof upon said chassis disposed therebelow for pivotal movements about an axis extending substantially laterally of said chassis and between normal and operative positions,
said front platform section in its normal position being generally horizontally disposed and in its operative position being upwardly and forwardly inclined,
means mounting said rear platform section adjacent to the front thereof upon said chassis disposed therebelow for pivotal movements about an axis extending substantially laterally of said chassis and between normal and operative positions,
said rear platform section in its normal position being generally horizontally disposed and in its operative position being upwardly and rearwardly inclined,
actuating means for selectively moving said platform sections independently of each other and between their respective normal and operative positions,
and a demountable freight container including an elongated longitudinally extending substantially rectangular base adapted to be supported on top of said composite platform, wherein said container is so supported in a generally horizontal low position when said front and rear platform sections occupy their respective normal positions,
wherein said container is so supported in a generally horizontal high position when said front and rear platform sections occupy their respective operative positions,
wherein said container is so supported in a forwardly inclined position when said front and rear platform sections occupy their respective operative and normal positions,
and wherein said container is so supported in a rearwardly inclined position when said front and rear platform sections occupy their respective normal and operative positions,
said composite platform having a width substantially the same as that of chassis,
and said base being substantially congruent with said composite platform when said front and rear platform sections occupy their respective normal positions.

9. The combination set forth in claim 8,
and further comprising four fixtures carried by said base respectively adjacent to four corners thereof and adapted respectively to receive four removable legs and accommodating the support of said container in its generally horizontal high position and independently of said front and rear platform sections,
and wherein said mobile vehicle may be driven out of or into position below said base when said container is supported in its generally horizontal high position via said fixtures and independently of said front and rear platform sections,
thereby to accommodate unloading and loading of said container with respect to said composite platform.

No references cited.

HUGO O. SCHULZ, *Primary Examiner.*